(12) United States Patent
Horibe et al.

(10) Patent No.: US 12,030,117 B2
(45) Date of Patent: Jul. 9, 2024

(54) SLIDING MEMBER

(71) Applicant: TAIHO KOGYO CO., LTD., Toyota (JP)

(72) Inventors: Naoki Horibe, Aichi (JP); Noriyuki Wada, Aichi (JP); Hiroshi Ito, Aichi (JP)

(73) Assignee: TAIHO KOGYO CO., LTD., Toyota (JP)

( * ) Notice: Subject to any disclaimer, the term of this patent is extended or adjusted under 35 U.S.C. 154(b) by 92 days.

(21) Appl. No.: 17/917,862

(22) PCT Filed: Apr. 7, 2021

(86) PCT No.: PCT/JP2021/014822
§ 371 (c)(1),
(2) Date: Oct. 7, 2022

(87) PCT Pub. No.: WO2021/206127
PCT Pub. Date: Oct. 14, 2021

(65) Prior Publication Data
US 2023/0150023 A1 May 18, 2023

(30) Foreign Application Priority Data
Apr. 8, 2020 (JP) .................................. 2020-070056

(51) Int. Cl.
*B22F 1/00* (2022.01)
*B22F 3/11* (2006.01)
(Continued)

(52) U.S. Cl.
CPC .................. *B22F 1/00* (2013.01); *B22F 3/11* (2013.01); *B22F 3/26* (2013.01); *B22F 7/00* (2013.01);
(Continued)

(58) Field of Classification Search
None
See application file for complete search history.

(56) References Cited

U.S. PATENT DOCUMENTS

| 3,305,325 A | 2/1967 | Le Brasse et al. |
| 4,208,472 A | 6/1980 | Cho et al. |

(Continued)

FOREIGN PATENT DOCUMENTS

| DE | 102013227187 A1 | 7/2015 |
| JP | 2002-12903 A | 1/2002 |

(Continued)

OTHER PUBLICATIONS

International Search Report for PCT/JP2021/014822 dated May 25, 2021.

(Continued)

*Primary Examiner* — Daniel J. Schleis
(74) *Attorney, Agent, or Firm* — Sughrue Mion, PLLC

(57) ABSTRACT

A sliding member (10) includes a base material (12), a porous sintered layer (14) provided on the base material (12), and a resin layer (16) impregnated into the porous sintered layer (14) and provided on the porous sintered layer (14). In the porous sintered layer (14), a porosity decreases from a second surface (S2) opposite to a first surface (S1) closer to the base material, toward the first surface (S1), the first surface and the second surface each being one of end surfaces in the thickness direction, and a decrease rate of the porosity in the thickness direction (Z) in a first region (E1) occupying 50% or more of the thickness of the porous sintered layer (14) from the second surface (S2) toward the first surface (S1) is larger than a decrease rate of the porosity in the thickness direction (Z) in a second region (E2) other than the first region (E1) in the porous sintered layer (14).

6 Claims, 3 Drawing Sheets

(51) Int. Cl.
  *B22F 3/26* (2006.01)
  *B22F 7/00* (2006.01)
  *C22C 9/02* (2006.01)
  *F16C 33/12* (2006.01)
  *F16C 33/20* (2006.01)

(52) U.S. Cl.
  CPC ............... *C22C 9/02* (2013.01); *F16C 33/12* (2013.01); *F16C 33/203* (2013.01)

(56) References Cited

U.S. PATENT DOCUMENTS

| | | | | |
|---|---|---|---|---|
| 4,394,275 A | * | 7/1983 | Bickle | ................ C22C 32/0094 |
| | | | | 508/104 |
| 5,643,683 A | * | 7/1997 | Tanaka | .................. F16C 33/201 |
| | | | | 428/548 |
| 9,360,048 B2 | | 6/2016 | Iwata et al. | |
| 10,054,091 B2 | | 8/2018 | Iwata et al. | |
| 2016/0319867 A1 | | 11/2016 | Adam et al. | |
| 2018/0200994 A1 | | 7/2018 | Shirasaka et al. | |

FOREIGN PATENT DOCUMENTS

| | | |
|---|---|---|
| JP | 2015-183236 A | 10/2015 |
| JP | 2015-196312 A | 11/2015 |
| JP | 2016-108600 A | 6/2016 |
| JP | 2016-108627 A | 6/2016 |
| JP | 2016-109235 A | 6/2016 |
| JP | 2002-327750 A | 11/2022 |
| WO | 2017/010059 A1 | 1/2017 |

OTHER PUBLICATIONS

German Office Action dated Mar. 30, 2023 in German Application No. 112021002278.4.

* cited by examiner

DEFECT OF IMPREGNATION INTO POROUS SINTERED LAYER
(NON-IMPREGNATED PART)

NON-IMPREGNATED PART

SLIDING MEMBER

FIELD

The present invention relates to a sliding member.

BACKGROUND

Conventionally, a configuration in which a porous layer is provided between the resin layer and the base material of a sliding member is known.

For example, as the porous layer, a configuration in which a plurality of granular inorganic fillers are stacked and a configuration in which a plurality of metal grains are bonded with a brazing material are disclosed.

CITATION LIST

Patent Literature

Patent Literature 1: JP 2002/327750 A
Patent Literature 2: JP 2016/108600 A

SUMMARY

Technical Problem

In the conventional techniques, however, it has been difficult to achieve both ease of impregnation of the resin layer into the porous layer and improvement in the resistance to peeling of the resin layer from the base material.

An object of the present invention is to provide a sliding member capable of achieving both ease of impregnation of the resin layer into the porous sintered layer and improvement in the resistance to peeling of the resin layer from the base material.

Solution to Problem

In order to solve the above problem and achieve the object, a sliding member according to the present invention includes a base material; a porous sintered layer provided on the base material; and a resin layer impregnated into the porous sintered layer and provided on the porous sintered layer, wherein in the porous sintered layer, a porosity decreases from a second surface opposite to a first surface closer to the base material, toward the first surface, the first surface and the second surface each being one of end surfaces in a thickness direction, and a decrease rate of the porosity in the thickness direction in a first region occupying 50% or more of thickness of the porous sintered layer from the second surface toward the first surface is larger than a decrease rate of the porosity in the thickness direction in a second region other than the first region of the porous sintered layer.

Advantageous Effects of Invention

According to the present invention, it is possible to achieve both ease of impregnation of the resin layer into the porous sintered layer and improvement in the resistance to peeling of the resin layer from the base material.

DESCRIPTION OF EMBODIMENTS

Figure 1:
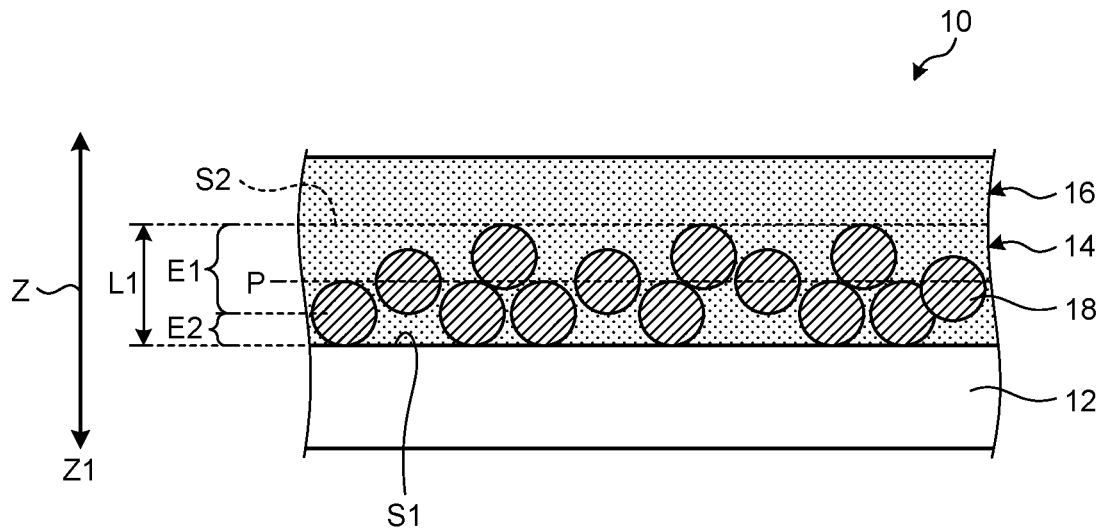
FIG. 1 is a schematic diagram illustrating an example of a sliding member according to an embodiment.

Hereinafter, an embodiment of a sliding member according to the present invention will be described in detail with reference to the accompanying drawings.

The sliding member of the present embodiment includes a base material, a porous sintered layer provided on the base material, and a resin layer impregnated into the porous sintered layer and provided on the porous sintered layer. In the porous sintered layer, a porosity decreases from a second surface opposite to the first surface closer to the base material, toward the first surface, the first surface and the second surface each being one of end surfaces in a thickness direction, and a decrease rate of the porosity in the thickness direction of a first region occupying 50% or more of the thickness of the porous sintered layer from the second surface toward the first surface is larger than a decrease rate of the porosity in the thickness direction of a second region other than the first region of the porous sintered layer.

Thereby, the sliding member of the present embodiment can achieve both ease of impregnation of the resin layer into the porous sintered layer and improvement in the resistance to peeling of the resin layer from the base material.

The reason why the above effect is exhibited is not clear, but it is presumed as follows. However, the present invention is not limited by the following presumption.

In the porous sintered layer of the sliding member of the present embodiment, the porosity decreases from the second surface opposite to the first surface closer to the base material, toward the first surface, the first surface and the second surface each being one of the end surfaces in the thickness direction. Thereby, it is presumed that pores of the porous sintered layer are effectively impregnated with a resin material when the resin layer is formed by impregnating the porous sintered layer with the resin material constituting the resin layer. In addition, it is presumed that pores of the porous sintered layer are effectively impregnated with the resin layer regardless of the magnitude of the viscosity of the resin material.

In addition, in the porous sintered layer of the sliding member of the present embodiment, a decrease rate of the porosity in the thickness direction of the first region occupying 50% or more of the thickness of the porous sintered layer from the second surface to the first surface is larger than a decrease rate of the porosity in the thickness direction of the second region other than the first region of the porous sintered layer. Thereby, it is presumed that improvement in the adhesion force between the entire porous sintered layer and the resin layer and reduction of variation in the adhesion force to the resin layer in the porous sintered layer can be achieved as compared with the case where a decrease rate of the porosity does not satisfy the above relationship. Therefore, it is presumed that the resin layer is firmly held to the base material by the porous sintered layer, and the resistance to peeling of the resin layer from the base material can be improved.

Hereinafter, the sliding member of the present embodiment will be described in detail.

FIG. 1 is a schematic diagram illustrating an example of a sliding member 10 according to the present embodiment. FIG. 1 schematically illustrates an example of a cross-sectional structure of the sliding member 10.

The sliding member 10 includes a base material 12, a porous sintered layer 14, and a resin layer 16. The sliding member 10 is a laminate of the base material 12, the porous sintered layer 14 formed on the base material 12, and the resin layer 16 impregnated into the porous sintered layer 14 and provided on the porous sintered layer 14.

The base material 12 is a layer for providing mechanical strength to the sliding member 10. The base material 12 is sometimes referred to as a back metal or a back metal layer. As the base material 12, for example, a metal plate such as an Fe alloy, Cu, or a Cu alloy can be used.

The porous sintered layer 14 is a porous layer produced by sintering.

The porosity decreases in the thickness direction Z (specifically, the direction of the arrow Z1) from the second surface S2 opposite to the first surface S1 loser to the base material 12, toward the first surface S1, the first surface and the second surface being end surfaces in the thickness direction Z (the first surface S1 and the second surface S2), in the porous sintered layer 14 of the present embodiment. In other words, in the porous sintered layer 14, the porosity of the second surface S2 farthest from the base material 12 is the highest, the porosity decreases toward the base material 12, and the porosity of the first surface S1 closest to the base material 12 is the lowest.

In addition, in the porous sintered layer 14, a decrease rate of the porosity in the thickness direction Z (specifically, the direction of the arrow Z1) of a first region E1 is larger than a decrease rate of the porosity in the thickness direction Z (specifically, the direction of the arrow Z1) of a second region E2.

The thickness direction Z is the thickness direction of the layer of the porous sintered layer 14, and coincides with the lamination direction of the base material 12, the porous sintered layer 14, and the resin layer 16.

The porosity refers to a proportion of a total area of pores to the total area of the cross section of the porous sintered layer 14. Specifically, the porosity is measured by the following method. First, the sliding member 10 is cut in a direction orthogonal to the thickness direction Z of the sliding member 10. Then, a photographed image is obtained by photographing the cut surface at an arbitrary magnification (e.g., 100 magnifications) using an electron microscope. Then, this photographed image is binarized using a known image analysis method, and regions of pores of the porous sintered layer 14 are specified. Then, the proportion of the total area of the regions of the pores to the total area of the cross section shown in the photographed image may be calculated as a porosity. Then, porosities at positions in the thickness direction Z may be measured by changing the cutting position in the thickness direction Z of the sliding member 10 and calculating porosities from cut surfaces at cutting positions by the above method.

In the porous sintered layer 14 having end surfaces in the thickness direction Z, the first surface S1 is an end surface on the base material 12 side. The first surface S1 is specifically a surface contacting with the base material 12 of the porous sintered layer 14.

The second surface S2 is an end surface opposite to the first surface S1 and is an end surface opposite to the base material 12 among the end surfaces in the thickness direction Z. The second surface S2 specifically includes a point farthest from the base material 12 on the surface of one or more inorganic particles 18 present at a position farthest from the base material 12 in the porous sintered layer 14 and is a surface parallel to a surface of the base material 12. The surface of the base material 12 having end surfaces in the thickness direction Z of the base material 12 is an end surface on the side of the porous sintered layer 14 and resin layer 16.

The thickness of the porous sintered layer 14 is the length of the porous sintered layer 14 in the thickness direction Z. Specifically, the thickness of the porous sintered layer 14 is a distance between the first surface S1 and the second surface S2 of the porous sintered layer 14 (see a distance L1 in FIG. 1).

The porosity of the porous sintered layer 14 only needs to decrease from the second surface S2 toward the first surface S1 along the thickness direction Z (that is, along the direction of the arrow Z1), and the porosity decrease may be either a stepwise decrease or a continuous decrease.

The first region E1 is a region having a thickness of 50% or more of the thickness of the porous sintered layer 14 from the second surface S2 toward the first surface S1 (the direction of the arrow Z1). In other words, the first region E1 is a region including the second surface S2 and having a thickness of 50% or more of the thickness of the porous sintered layer 14 from the second surface S2 toward the first surface S1 in the porous sintered layer 14.

Incidentally, the first region E1 may be a region having a thickness of 50% or more of the porous sintered layer 14 from the second surface S2 toward the first surface S1, but is preferably a region having 50% or more and 70% or less, and more preferably a region having 55% or more and 65% or less.

When the first region E1 is a region within the above range in the porous sintered layer 14, the resistance to peeling of the resin layer 16 from the base material 12 can be effectively improved.

The second region E2 is a region other than the first region E1 in the porous sintered layer 14. Specifically, the second region E2 is a region from the end surface on the base material 12 side of the first region E1 to the first surface S1 in the porous sintered layer 14.

As described above, a decrease rate of the porosity in the thickness direction Z of the first region E1 is larger than a decrease rate of the porosity in the thickness direction Z of the second region E2. The decrease rate of the porosity refers to a decrease rate of the porosity in the thickness direction Z from the second surface S2 toward the second surface S2 (specifically, the direction of the arrow Z1) with respect to the unit thickness of the porous sintered layer 14.

When the decrease rate of the porosity in the thickness direction Z of the first region E1 is larger than the decrease rate of the porosity in the thickness direction Z of the second region E2, it is possible to attain ease of impregnation of the resin layer 16 into the porous sintered layer 14 while maintaining the resistance to peeling of the resin layer 16 from the base material 12.

Figure 2:
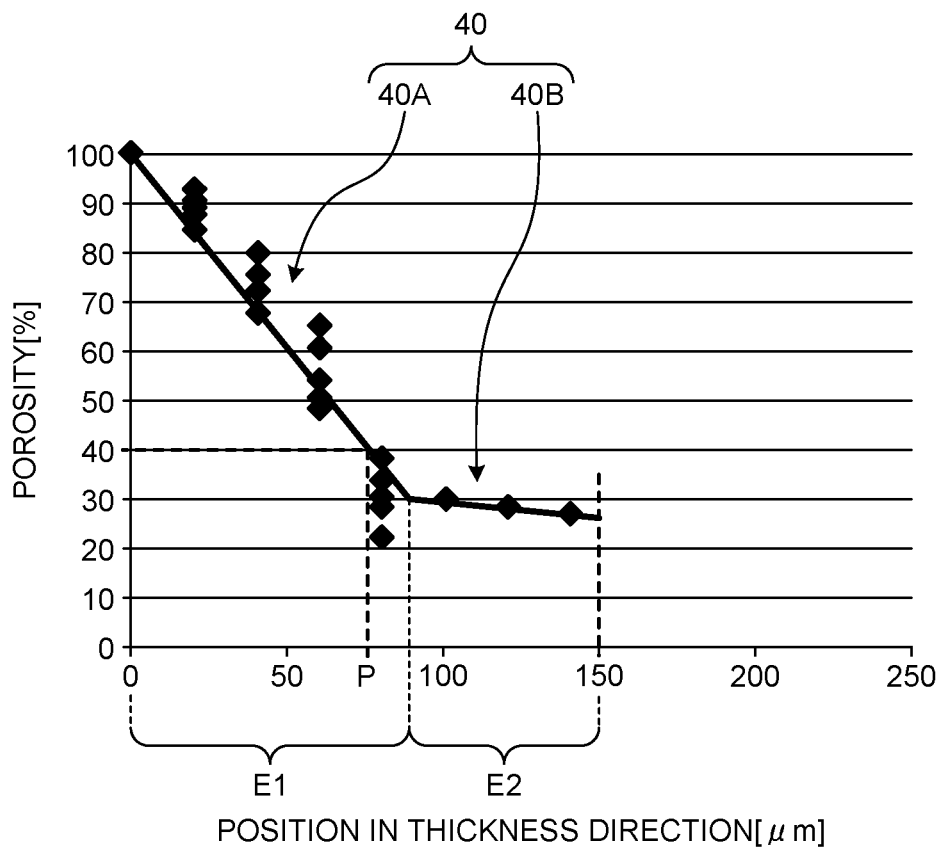
FIG. 2 is a graph illustrating an example of the relationship between the porosity and the position in the thickness direction of a porous sintered layer of the embodiment.

FIG. 2 is a graph illustrating an example of the relationship between the porosity and the position in the thickness direction Z of the porous sintered layer 14 in the sliding member 10 of the present embodiment. In FIG. 2, the vertical axis shows the porosity of the porous sintered layer 14. The horizontal axis shows the position in the thickness direction Z of the porous sintered layer 14. In addition, the position in the thickness direction on the horizontal axis, on which the thickness of the porous sintered layer 14 is 150 μm, is shown with the position of the second surface S2 as 0 μm and the position of the first surface S1 as 150 μm.

In the case of the example shown in FIG. 2, change in the porosity of the porous sintered layer 14 is represented by, for example, a line graph 40. The line graph 40 is expressed with a line graph 40A and a line graph 40B having different decrease rates of the porosity. A decrease rate of the porosity represented by the line graph 40A is larger than a decrease rate of the porosity represented by the line graph 40B. Therefore, in the example shown in FIG. 2, the first region E1 is a region having a thickness to a position of a thickness of about 80 μm from the second surface S2 toward the first surface S1 in the porous sintered layer 14. The second region E2 is a region having a thickness from the position of a thickness of about 80 μm to a position of 150 μm as the first surface S1 from the second surface S2 toward the first surface S1 in the porous sintered layer 14.

Returning to FIG. 1, the description will be continued. The porosity of a central part P in the thickness direction Z of the porous sintered layer 14 is preferably 30% or more and less than 50%.

The porosity of the central part P in the thickness direction Z of the porous sintered layer 14 refers to a porosity of a cut surface obtained by cutting the porous sintered layer 14 along a line passing through the center of the porous sintered layer 14 in the thickness direction Z.

The porosity of the central part P in the thickness direction Z of the porous sintered layer 14 is preferably 30% or more and less than 50%, and more preferably 35% or more and 45% or less.

In addition, the porosity of the second surface S2 of the porous sintered layer 14 is higher than that of the central part P. Specifically, the porosity of the second surface S2 is preferably 30% or more.

In addition, the porosity of the first surface S1 of the porous sintered layer 14 is lower than that of the central part P. Specifically, the porosity of the first surface S1 is preferably 15% or more and 40% or less, and more preferably 20% or more and 35% or less.

When the porosities of the central part P, the first surface S1, and the second surface S2 in the thickness direction Z of the porous sintered layer 14 fall within the above-mentioned ranges, it is possible to attain ease of impregnation of the resin layer 16 into the porous sintered layer 14 while maintaining the resistance to peeling of the resin layer 16 from the base material 12.

The porous sintered layer 14 only needs to satisfy the above-mentioned relationship of the porosities, and the constituent material thereof is not limited. For example, the porous sintered layer 14 may include a sintered layer of a plurality of inorganic particles 18.

The porous sintered layer 14 is produced by, for example, sintering a plurality of the inorganic particles 18. The inorganic particles 18 may be any particles capable of forming the porous sintered layer 14 by being sintered, and the constituent material of the inorganic particles 18 is not limited. The inorganic particles 18 are a copper-based alloy. The inorganic particles 18 are, for example, pure copper, a Cu alloy such as bronze, lead bronze, or phosphor bronze, or a composite material obtained by dispersing a powder such as FeP or $Al_2O_3$ in the pure copper or the copper alloy.

The average particle diameter of the inorganic particles 18 is preferably 75 μm or more and 150 μm or less, and more preferably 80 μm or more and 125 μm or less.

The average particle diameter of the inorganic particles 18 indicates a volume average particle diameter. Specifically, the average particle diameter of the inorganic particles 18 refers to a value measured using a laser diffraction/scattering type particle diameter distribution measuring apparatus (LS Particle Size Analyzer: LS13 320, manufactured by BECKMAN COULTER, Inc.). With respect to particle diameter ranges (channels) obtained by dividing an obtained particle diameter distribution, a volume cumulative distribution is subtracted from the small particle diameter side, and a particle diameter at which the cumulative 50% is obtained is defined as an average particle diameter (volume average particle diameter) $D_{50v}$ of the inorganic particles 18.

In addition, in the porous sintered layer 14, it is preferable that the average particle diameter of the inorganic particles 18 constituting the porous sintered layer 14 is in the above-mentioned range, and that the ratio of the thickness of the porous sintered layer 14 to the average particle diameter of the inorganic particles 18 is preferably 1.1 times or more and 2.2 times or less.

Incidentally, the ratio of the thickness of the porous sintered layer 14 to the inorganic particles 18 in the range of the above-mentioned average particle diameter is preferably 1.1 times or more and 2.2 times or less, and more preferably 1.3 times or more and 1.8 times or less.

When the ratio of the thickness of the porous sintered layer 14 to the inorganic particles 18 in the range of the above-mentioned average particle diameter is in the above range, it is possible to more effectively attain both improvement in the resistance to peeling of the resin layer 16 from the base material 12 and ease of impregnation of the resin layer 16 into the porous sintered layer 14.

In addition, the porous sintered layer 14 is preferably a laminate obtained by stacking 1.1 layers or more and 2.2 layers or less of the inorganic particles 18, and more preferably a laminate obtained by stacking 1.3 layers or more and 1.8 layers or less.

When the lamination state of the inorganic particles 18 in the porous sintered layer 14 is the above state, it is possible to more effectively attain both improvement in the resistance to peeling of the resin layer 16 from the base material 12 and ease of impregnation of the resin layer 16 into the porous sintered layer 14.

The inorganic particles 18 constituting the porous sintered layer 14 may have substantially the same size (particle diameter) or different sizes. The term "substantially the same" means that the particle diameter of one particle with respect to the particle diameter of the other particle is within a range of ±10%. Incidentally, the inorganic particles 18 constituting the porous sintered layer 14 preferably have substantially the same size.

The shape of each of the inorganic particles 18 is not limited. The shape of each of the inorganic particles 18 may be any of a spherical shape, a substantially spherical shape without a sharp edge, and other deformed shapes (such as flaky, dendritic, chain-like, scalenohedral shapes).

All the inorganic particles 18 constituting the porous sintered layer 14 may have the same shape, or a particle having a different shape may be mixed.

When the porous sintered layer 14 has a form in which the inorganic particles 18 having different shapes are mixed, the proportion of the inorganic particles 18 having a minor axis/major axis ratio in the range of 0.2 or more and 0.7 or less in all the inorganic particles 18 constituting the porous sintered layer 14 is preferably 50% or more, and more preferably 70% or more. In addition, the proportion of the inorganic particles 18 having a minor axis/major axis ratio in the range of 0.2 or less in all the inorganic particles 18 constituting the porous sintered layer 14 is preferably 30% or less, and more preferably 10% or less.

Incidentally, the thickness of the porous sintered layer 14 is preferably 0.11 mm or more and 0.22 mm or less, and more preferably 1.3 mm or more and 1.8 mm or less, specifically.

Next, the resin layer 16 will be described. The resin layer 16 is a layer including a resin material. The resin material includes a synthetic resin and an additive dispersed in the synthetic resin.

As the synthetic resin, polytetrafluoroethylene (PTFE) is mainly used. Furthermore, tetrafluoroethylene/perfluoro-alkoxyethylene copolymer (PFA), perfluoroethylene propene copolymer (FEP), low molecular weight PTFE, or the like can be added.

The synthetic resin may be a synthetic resin containing not only PTFE but also one or more selected from polyimide (PI), polyamideimide (PAI), polybenzimidazole (PBI), polyamide (PA), a phenol resin, an epoxy resin, polyacetal (POM), polyetheretherketone (PEEK), polyethylene (PE), polyphenylene sulfide (PPS), and polyetherimide (PEI).

For reducing the friction coefficient of the synthetic resin and stabilizing the friction, an additive can be added. As such an additive, for example, an additive selected from solid lubricants such as graphite, molybdenum disulfide, tungsten disulfide, $CF_2$, $CaF_2$, and BN, and soft metals such as Pb, Bi, and Sn may be added.

In addition, an additive can be added to improve the abrasion resistance of the synthetic resin. As such an additive, one or more additives selected from salts such as $BaSO_4$, $CaSO_4$, calcium phosphate, magnesium phosphate, and magnesium silicate, resins such as aromatic polyester, polyimide, and PEEK, oxides such as $Al_2O_3$, $FeO_3$, and $TiO_2$, sulfides such as ZnS, carbides such as TiC, glass fibers, carbon fibers, carbon, and the like can be added.

EXAMPLES

Hereinafter, the present invention will be specifically described with reference to Examples, but the present invention is not limited to these Examples.

Test pieces each having a porous sintered layer 14 or a comparative porous layer described below and a resin layer 16 were prepared, and these test pieces were evaluated for ease of impregnation of the resin layer 16 into each of the porous sintered layer 14 and the comparative porous layer and for the peeling resistance of the resin layer 16.

Preparation of Test Pieces

Step 1: A steel plate (SPCC (JIS)) having a thickness of 1.32 mm was prepared as a base material 12.

Step 2: A powder of phosphor bronze (Cu, 6% Sn, and 0.1% P) was sprayed on the base material 12.

Step 3: The powder of the step 2 was sintered at 900° C. to 950° C. to produce a porous sintered layer.

Step 4: Next, a PTFE powder and an additive were mixed, and an auxiliary agent was added to prepare a mixed powder.

Step 5: The synthetic resin that is the above mixed powder was impregnated into the porous sintered layer with a roll.

Step 6: The impregnated material obtained in the step 5 was dried at 150° C. to 200° C. for about 10 minutes.

Step 7: Then, firing was performed at 380° C. to 400° C. for about 10 minutes.

Test pieces each having a porous sintered layer of Example 1, 2, or 3 and test pieces each having a comparative porous layer of Comparative Example 1 or 2 were prepared by the above Steps 1 to 7. Incidentally, the porosity of the porous sintered layer was adjusted by adjusting the particle diameter of the powder sprayed in Step 2.

FIG. 2 is a graph illustrating a measurement result of the relationship between the porosity and the position in the thickness direction Z of the porous sintered layer 14 in the test piece of Example 1. In FIG. 2, the vertical axis shows the porosity of the porous sintered layer 14. The horizontal axis shows the position in the thickness direction Z of the porous sintered layer 14. In addition, as for the thickness direction on the horizontal axis, the thickness of the porous sintered layer 14 is 150 μm, and the position of the second surface S2 is shown as 0 μm and the position of the first surface S1 as 150 μm.

As shown in FIG. 2, in Example 1, change in the porosity of the porous sintered layer 14 was represented by a line graph 40. The line graph 40 was expressed with a line graph 40A and a line graph 40B. The line graph 40A shows a decrease rate of the porosity of the first region E1, and a line graph 40B shows a decrease rate of the porosity of the second region E2. As shown in FIG. 2, the first region E1 of the porous sintered layer 14 of Example 1 was a region occupying 80% of the thickness of the porous sintered layer 14 from the second surface S2. In addition, the decrease rate of the porosity of the first region E1 was larger than the decrease rate of the porosity of the second region E2. In addition, the porosity of the central part P of the porous sintered layer 14 was 40%.

Figure 3:
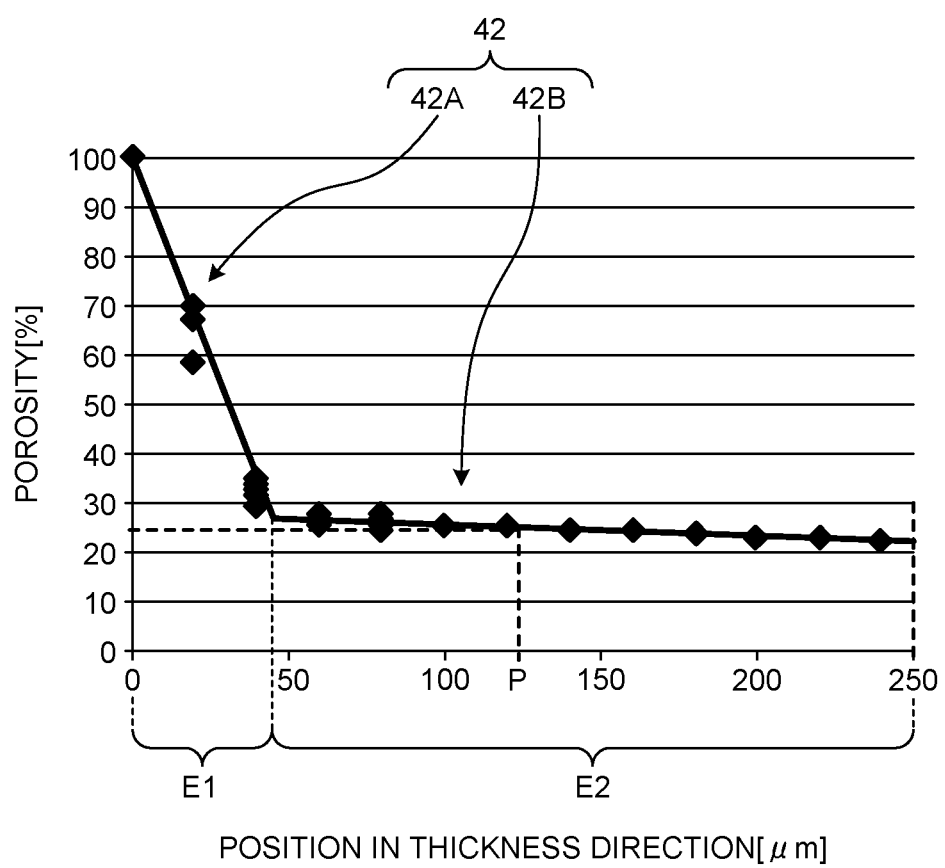
FIG. 3 is a graph illustrating a measurement result of the relationship between the porosity and the position in the thickness direction of a comparative porous layer.

FIG. 3 is a graph illustrating a measurement result of the relationship between the porosity and the position in the thickness direction Z of the comparative porous layer in the test piece of Comparative Example 1. In FIG. 3, the vertical axis shows the porosity of the comparative porous layer. The horizontal axis shows the position in the thickness direction Z of the comparative porous layer. In addition, the position in the thickness direction on the horizontal axis, on which the thickness of the comparative porous layer is 250 μm, is shown with the position of the second surface S2 as 0 μm and the position of the first surface S1 as 250 μm.

As shown in FIG. 3, in Comparative Example 1, change in the porosity of the comparative porous layer was represented by a line graph 42. The line graph 42 was expressed with a line graph 42A and a line graph 42B. The line graph 42A shows a decrease rate of the porosity of the first region E1, and a line graph 42B shows a decrease rate of the porosity of the second region E2. As shown in FIG. 3, the first region E1 of the comparative porous layer of Comparative Example 1 was a region occupying 20% of the thickness of the comparative porous layer from the second surface S2. In addition, the decrease rate of the porosity of the first region E1 was larger than the decrease rate of the porosity of the second region E2. In addition, the porosity of the central part P of the comparative porous layer was 25%.

Figure 4:
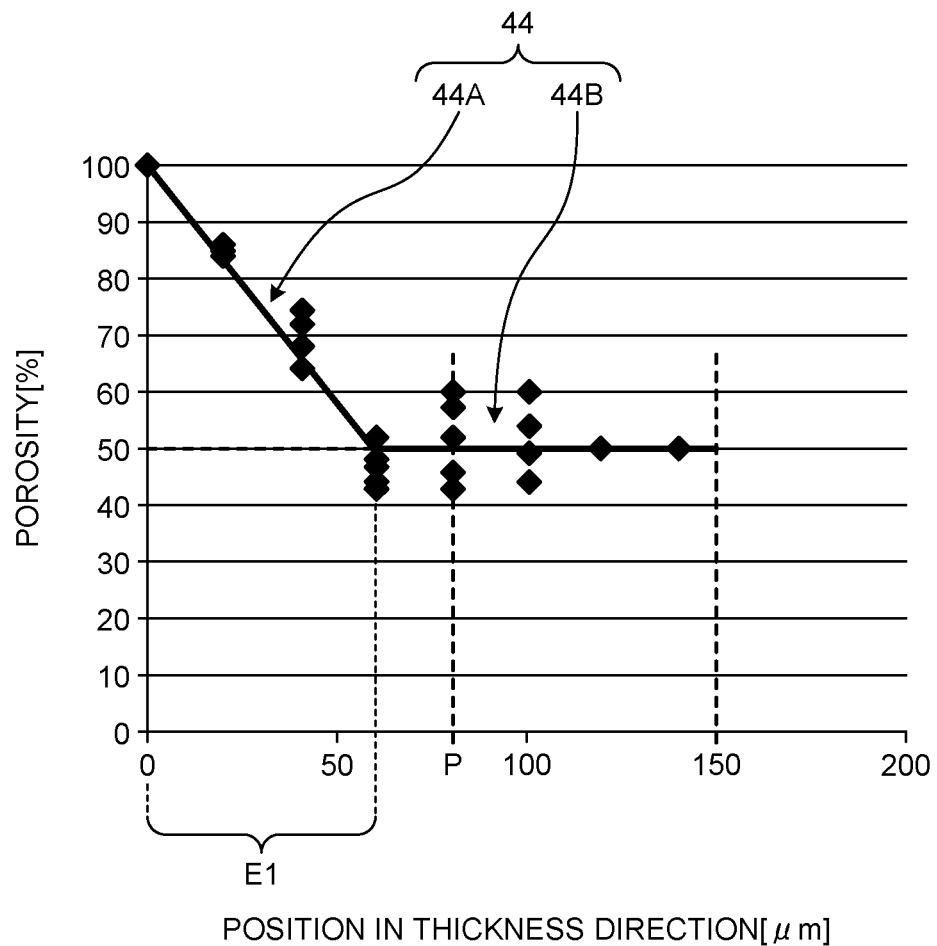
FIG. 4 is a graph illustrating a measurement result of the relationship between the porosity and the position in the thickness direction of a comparative porous layer.

FIG. 4 is a graph illustrating a measurement result of the relationship between the porosity and the position in the thickness direction Z of the comparative porous layer in the test piece of Comparative Example 2. In FIG. 4, the vertical axis shows the porosity of the comparative porous layer. The horizontal axis shows the position in the thickness direction Z of the comparative porous layer. In addition, the position in the thickness direction on the horizontal axis, on which the thickness of the comparative porous layer is 150 μm, is shown with the position of the second surface S2 as 0 μm and the position of the first surface S1 as 150 μm.

As shown in FIG. 4, in Comparative Example 2, change in the porosity of the comparative porous layer was represented by a line graph 44. The line graph 44 was expressed with a line graph 44A and a line graph 44B. The line graph 44A shows a decrease rate of the porosity of a first region E1. On the other hand, as shown in the line graph 44B, the line graph 44B shows that the porosity is substantially constant. Therefore, in Comparative Example 2, the second region E2 did not exist. No decrease in the porosity was shown.

In addition, the first region E1 of the comparative porous layer of Comparative Example 2 was a region occupying 40% of the thickness of the comparative porous layer from the second surface S2. Further, the porosity of the central part P of the comparative porous layer was 50%.

Evaluation

Ease of Impregnation into Porous Sintered Layer (or Comparative Porous Layer)

Impregnation defects of the resin material described above in the porous sintered layer 14 and the comparative porous layer at the time of preparing test pieces of Examples and Comparative Examples were evaluated, and the evaluation results are shown in Table 1. In Table 1, the smaller the value shown in the column of "Difficulty in occurrence of impregnation defect" is, the more the occurrence of the impregnation defect is. In addition, in Table 1, the larger the value shown in the column of "Difficulty in occurrence of impregnation defect" is, the less the occurrence of the impregnation defect is. In Table 1, when the value shown in the column of "Difficulty in occurrence of impregnation defect" is "1", it means that an impregnation defect has occurred, when the value is "2", it means that impregnation defects have partly occurred, and when the value is "3", it means that an impregnation defect hardly occurs.

Figure 5:
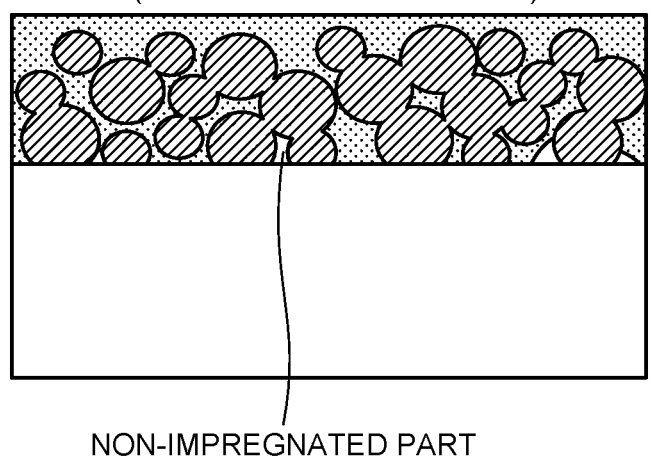
FIG. 5 is a diagram illustrating a cross section on the observation side of a sample.

The occurrence of the impregnation defect can be seen by observing the cross section of the samples. However, for a material of PTFE, the material was carefully polished due to generation of resin flow at the time of polishing the cross section, then subjected to cross section polisher processing, and observed with an electron microscope (see FIG. 5).

Peeling Resistance of Resin Layer

The peeling resistance of each resin layer 16 in the test pieces of Examples and Comparative Examples was evaluated.

For the peeling resistance, the base material 12 was fixed, a load was applied in the thickness direction Z in such a way that the end part along the axis orthogonal to the thickness direction Z of the resin layer 16 is toward the side away from the base material 12 with respect to the base material 12, and the load when a tear occurred was measured as a peeling strength. The measurement results are shown in Table 1.

As shown in Table 1, in Examples in which the porosity decreases from the second surface toward the first surface S1, and the decrease rate of the porosity from the second surface S2 toward the first surface S1 in the thickness direction Z of the first region E1 occupying 50% or more of the thickness of the porous sintered layer 14 is larger than the decrease rate of the porosity in the thickness direction Z of the second region E2, the porous sintered layer 14 was easily impregnated with the resin layer 16, and the peeling resistance of the resin layer 16 was high as compared with Comparative Examples not satisfying the conditions.

On the other hand, in Comparative Examples, the results were obtained that at least one of ease of impregnation of the resin layer 16 into the comparative porous layer and the peeling resistance of the resin layer 16 was lower than those in Examples.

Thus, when the porous sintered layer 14 shown in Examples was used, the evaluation result was obtained that both ease of impregnation of the resin layer 16 into the porous sintered layer 14 and improvement in the resistance to peeling of the resin layer 16 from the base material 12 can be achieved as compared with Comparative Examples.

It should be noted that various materials and compositions thereof used in the above-described Examples are merely examples, and the present invention is not limited thereto. The resin layer 16 according to the present invention may contain inevitable impurities. The specific structure of the sliding member 10 is not limited to that exemplified in FIG. 1.

REFERENCE SIGNS LIST

10 SLIDING MEMBER
12 BASE MATERIAL
14 POROUS SINTERED LAYER
16 RESIN LAYER
18 INORGANIC PARTICLE
S1 FIRST SURFACE
S2 SECOND SURFACE

The invention claimed is:
1. A sliding member comprising:
a base material;
a porous sintered layer provided on the base material; and
a resin layer impregnated into the porous sintered layer and provided on the porous sintered layer,
wherein in the porous sintered layer, a porosity decreases from a second surface opposite to a first surface closer to the base material, toward the first surface, the first surface and the second surface each being one of end surfaces in a thickness direction, and a decrease rate of the porosity in the thickness direction in a first region occupying 50% or more of thickness of the porous sintered layer from the second surface toward the first surface is larger than a decrease rate of the porosity in

TABLE 1

|  | Material component (wt %) | | | | Test result | |
|  |  | | | | Abrasion | |
|  | PTFE | Magnesium phosphate | Barium sulfate | Molybdenum disulfide | Calcined clay | loss (μm) | Friction coefficient |
| --- | --- | --- | --- | --- | --- | --- | --- |
| Example 1 | Balance | 15.6 | 13.0 | 6.0 | 3.1 | 5 | 0.09 |
| Example 2 | Balance | 12.5 | 16.1 | 4.1 | 1.3 | 9 | 0.07 |
| Example 3 | Balance | 13.3 | 16.9 | 4.7 | 2.1 | 7 | 0.07 |
| Example 4 | Balance | 14.0 | 17.7 | 5.4 | 2.9 | 9 | 0.06 |
| Example 5 | Balance | 14.8 | 18.5 | 6.0 | 3.6 | 8 | 0.06 | the thickness direction in a second region other than the first region of the porous sintered layer.

2. The sliding member according to claim 1, wherein the porous sintered layer has a porosity of 30% or more and less than 50% at a central part in the thickness direction.

3. The sliding member according to claim 1, wherein
the porous sintered layer comprises a plurality of inorganic particles having an average particle diameter of 75 µm or more and 150 µm or less, and
a ratio of the thickness of the porous sintered layer to the average particle diameter of the plurality of inorganic particles is 1.1 times or more and 2.2 times or less.

4. The sliding member according to claim 3, wherein the porous sintered layer is a laminate formed by stacking 1.1 or more and 2.2 or less layers of the inorganic particles.

5. The sliding member according to claim 3, wherein the porous sintered layer has a thickness of 0.11 mm or more and 0.22 mm or less.

6. The sliding member according to claim 3, wherein the inorganic particles are a copper-based alloy.

* * * * *